(12) United States Patent
Everett

(10) Patent No.: US 9,414,714 B2
(45) Date of Patent: Aug. 16, 2016

(54) BAKING FUNNEL

(71) Applicant: Jeanette Everett, Colvis, NM (US)

(72) Inventor: Jeanette Everett, Colvis, NM (US)

( * ) Notice: Subject to any disclaimer, the term of this patent is extended or adjusted under 35 U.S.C. 154(b) by 157 days.

(21) Appl. No.: 14/078,773

(22) Filed: Nov. 13, 2013

(65) Prior Publication Data

US 2015/0129085 A1    May 14, 2015

(51) Int. Cl.
*B67C 11/02* (2006.01)
*A47J 43/28* (2006.01)

(52) U.S. Cl.
CPC . *A47J 43/28* (2013.01); *B67C 11/02* (2013.01)

(58) Field of Classification Search
CPC .......... B67C 11/00; B67C 11/02; A47J 43/28
USPC .................................. 141/331, 337
See application file for complete search history.

(56) References Cited

U.S. PATENT DOCUMENTS

| | | | |
|---|---|---|---|
| 1,399,916 A * | 12/1921 | Aronson | 222/420 |
| 1,733,261 A * | 10/1929 | Higby et al. | 141/337 |
| 5,121,779 A * | 6/1992 | Green | 141/337 |
| 6,276,411 B1 * | 8/2001 | Veneziano | 141/337 |
| 7,246,639 B2 * | 7/2007 | Kuntz | 141/86 |
| 7,677,276 B2 * | 3/2010 | Sun | 141/332 |
| 7,851,038 B2 * | 12/2010 | Lohmeier | 428/35.9 |
| 8,567,456 B1 * | 10/2013 | Francis | 141/332 |
| D697,540 S * | 1/2014 | Nkwantabisa | D15/150 |
| D703,010 S * | 4/2014 | Meyer | D7/700 |
| 2002/0038677 A1* | 4/2002 | Wiethoff | 141/337 |
| 2009/0283178 A1* | 11/2009 | Sun | 141/337 |
| 2011/0135876 A1* | 6/2011 | Lohmeier | 428/138 |
| 2012/0090724 A1* | 4/2012 | Heller | 141/1 |
| 2014/0014232 A1* | 1/2014 | Liu | 141/391 |
| 2014/0338787 A1* | 11/2014 | Tarasoff | B67C 11/02 |
| | | | 141/338 |

* cited by examiner

*Primary Examiner* — Nicolas A Arnett
(74) *Attorney, Agent, or Firm* — The Law Office of Jerry D. Haynes

(57) ABSTRACT

The present invention relates to a funnel comprising: a funnel body, where said funnel body includes an inner layer and an outer layer, and where said funnel body is made of a flexible material; a wide first opening and a wide second opening, where the first opening is larger than the second opening, and where the first opening has a curved portion and a planar portion; and an outwardly extending curved lip disposed on the rim of the first opening.

9 Claims, 1 Drawing Sheet

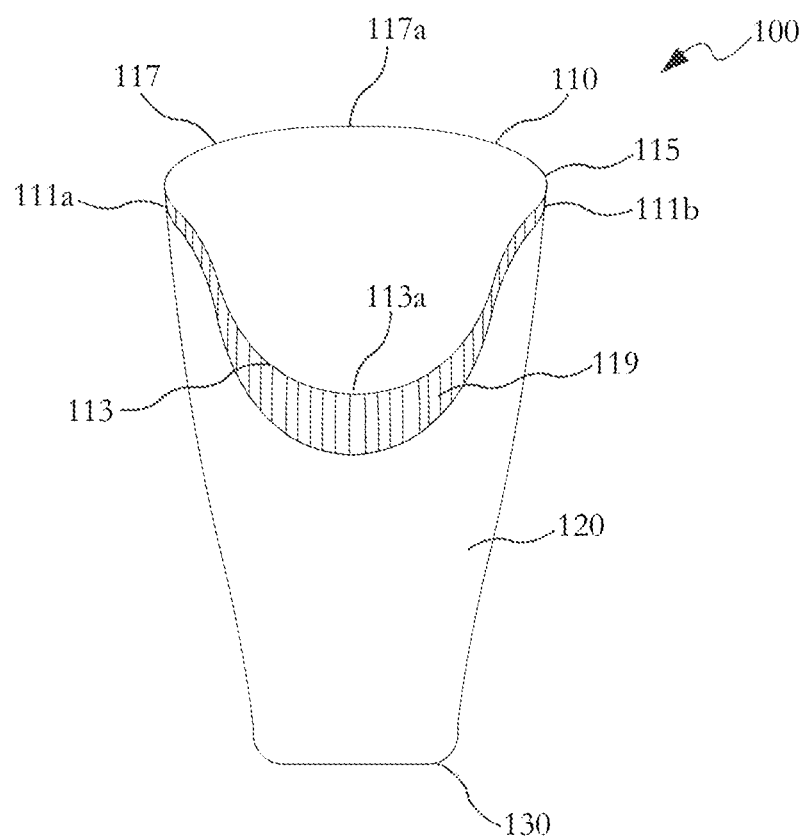

BAKING FUNNEL

BACKGROUND OF THE INVENTION

1. Field of Invention

The present invention relates to flexible funnel with wide openings to assist in funneling wet and dry ingredients during baking and other cooking practices.

2. Description of Related Art

Many individuals use funnels as a tool to aid with baking and cooking. They use said funnels in order to channel wet and dry ingredients into receptacles such as mixing bowls. Conventional funnels, however, are rigid and comprise a small mouth and spout. The small mouth feature is problematic for individuals attempting to funnel large amounts of ingredients into a mixing bowl because individuals must add ingredients in small increments into the funnel and stand by waiting for the ingredients to trickle through. Furthermore, the small spout feature in conventional funnels is problematic for individuals because due to the small circumference of the spout, the wet and dry ingredients tend to back up in the body of the funnel and are thus prevented from being channeled into the mixing bowl. Moreover, the rigidness feature in conventional funnels makes it difficult to manipulate and maneuver the funnel in and around mixing bowls when pouring said ingredients.

Therefore, it would be desirable in the art to have a funnel with a wide mouth and a wide spout. It would also be desirable in the art for the funnel to be made of a flexible material for easier manipulation of same.

SUMMARY OF THE INVENTION

The present invention relates to a funnel comprising: a funnel body, where said funnel body includes an inner layer and an outer layer, and where said funnel body is made of a flexible material; a first opening and a second opening, where the first opening is larger than the second opening; and an outwardly extending curved lip disposed on the rim of the first opening.

BRIEF DESCRIPTION OF DRAWINGS

The advantages and features of the present invention will become better understood with reference to the following detailed description and claims taken in conjunction with the accompanying drawing and in which:

FIG. 1 depicts a perspective view of funnel in accordance with an exemplary embodiment of the present invention.

DETAILED DESCRIPTION

The present invention relates to a flexible funnel comprising a wide first opening and a wide second opening. The first opening (i.e. the mouth of the funnel) has a planar portion and a curved portion; the curved portion has an outwardly extended lip. The outwardly extended lip gradually increases in size and extends up to 1.5 inches from the rim of the curved portion. Further, the first opening measures about 5 inches from the midpoint of the curved portion to the midpoint of the planar portion and measures about 7 inches from the points in which the curved portion and the planar portion converge, respectively. The second opening is oval in shape and its large diameter measures about 4.5 inches. The funnel body includes an inner layer and an outer layer. Both layers are flexible and provide a pliable and collapsible feature for the funnel to be used when channeling wet and dry ingredients.

Turning now descriptively to the drawings, referring to FIG. 1, a perspective view of a funnel 100 in accordance with an exemplary embodiment of the present invention. The funnel includes a funnel body 120, a first opening 110, and a second opening 130. The funnel body is made of an inner layer (not shown) and an outer layer (not shown). The inner layer is made of a plastic material. More specifically, the inner layer is made of 98.2% high-density polyethylene and 7.2% ethylene vinyl acetate but may be made with any suitable material. The inner layer's material is safe for food products. The outer layer is made of a silicone material but may be made with any suitable material. The funnel body 110 tapers from the first opening 120 to the second opening 130.

The first opening 110 comprises a continuous rim 115 with curved portion 113 and a planar portion 117. The curved portion 113 has an outwardly extended lip 119. The outwardly extended lip 119 gradually extends in size and at it's most extended point, extends about 1.5 inches from the rim 115 of the curved portion 113. Further, the first opening 110 measures about 5 inches from the midpoint of the curved portion 113a to the midpoint of the planar portion 117a and measures about 7 inches from the points in which the curved portion and the planar portion converge 111a, 111b. The second opening 130 is oval in shape and its large diameter measures about 4.5 inches.

The flexible design of the funnel 100 of the present invention allows the user to manipulate and maneuver the funnel 100 in and around mixing bowls when using same to channel wet and dry ingredients. Further, the wide first opening 110 and wide second opening 130 allow the user to quickly pour large amounts of ingredients into the funnel 100 without worrying about the ingredients backing up in the body of the funnel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A funnel comprising:
   a. a funnel body, where the funnel body comprises an inner layer and an outer layer, where the inner layer is made of a food safe material and the outer layer is made of a silicone material;
   b. a first opening, where the first opening comprises a continuous rim with a curved portion and a planar portion, where the curved portion comprises an outwardly extended lip and the extended lip gradually increases in size; and
   c. a second opening, where the second opening is narrower than the first opening.

2. The funnel according to claim 1, where the funnel body tapers from the first opening to the second opening.

3. The funnel according to claim 1, where the funnel body is made of a flexible material.

4. The funnel according to claim 1, where the inner layer of the funnel body is made of a flexible and plastic material.

5. The funnel according to claim 1, where the inner layer of the funnel body is made of 98.2% high-density polyethylene and 7.2% ethylene vinyl acetate.

6. The funnel according to claim 1, where the extended lip extends about 1.5 inches from the rim of the curved portion of the first opening.

7. The funnel according to claim 1, where the first opening measures about 5 inches from the midpoint of the curved portion to the midpoint of the planar portion and measures about 7 inches from the points in which the curved portion and the planar portion converge.

8. The funnel according to claim 7, where the second opening is oval in shape.

9. The funnel according to claim 1, where the second opening measures 4.5 inches.

* * * * *